United States Patent [19]
Holt

[11] 4,034,162
[45] July 5, 1977

[54] TELEPHONE RECEIVER-OFF-HOOK DETECTOR

[75] Inventor: James Tyler Holt, Elon College, N.C.

[73] Assignee: Bell Telephone Laboratories, Incorporated, Murray Hill, N.J.

[22] Filed: June 28, 1976

[21] Appl. No.: 700,330

[52] U.S. Cl. .................. 179/18 AB; 179/175.2 C; 324/51
[51] Int. Cl.² ........................................ H04M 3/22
[58] Field of Search ............... 179/18 AB, 175.2 C, 179/175.2 R, 175.24, 16 F; 324/51; 340/248 R, 253 H, 253 Y, 253 Z

[56] References Cited
UNITED STATES PATENTS 3,287,502  11/1966  Röhrig .......................... 179/18 AB

*Primary Examiner*—Thomas A. Robinson
*Attorney, Agent, or Firm*—H. L. Logan

[57] ABSTRACT

First and second alternating signals at a central office are applied to a telephone subscriber's lines. The level of the second signal current is used to control the level of the first signal. The nonlinear impedance vs. voltage characteristic of the subscriber's telephone in an off-hook state causes harmonics of the first signal to be generated. Harmonics so generated are detected at the central office to indicate the presence of a receiver-off-hook telephone.

5 Claims, 3 Drawing Figures

TELEPHONE RECEIVER-OFF-HOOK DETECTOR

BACKGROUND OF THE INVENTION

1. Field of the Invention

This invention relates to communication path testing, and, in particular, to methods and apparatus for detecting, from a telephone central office, a subscriber telephone in a receiver-off-hook condition.

2. Description of the Prior Art

A frequent telephone trouble report is where a subscriber reports repeated busy signals when trying to reach a second subscriber. Assuming the first subscriber has dialed correctly, busy signals may be produced by a receiver-off-hook-and-in-use condition, by a receiver-off-hook-and-not-in-use condition, or by a leakage path between the first subscriber's telephone line conductors.

A receiver-off-hook-and-in-use condition may be rapidly detected by voice detecting equipment. When such a condition does not exist, the two remaining possibilities may be distinguished from one another by taking advantage of the nonlinear resistance versus voltage characteristic of a receiver-off-hook telephone and the substantially linear resistance versus voltage characteristic of a conductor-to-conductor leakage path. Apparatus for performing such a function is disclosed in copending application Ser. No. 700,329, filed on even date herewith by R. S. Hoppough.

The Hoppough apparatus applies a controlled-amplitude, alternating test signal at a central office to a subscriber's lines. The controlled amlitude of the test signal prevents elements other than a receiver-off-hook telephone from being driven to the point that they appear as nonlinear impedances. The nonlinear impedance vs. voltage characteristic of the subscriber's telephone in a receiver-off-hook state causes harmonics of the test signal to be generated. A harmonic so generated is detected at the central office, which indicates the presence of a receiver-off-hook telephone.

Although the above-described apparatus provides the desired results under most conditions, there are some conditions under which ambiguities may occur. In some cases it was found that load coils could still present nonlinear appearances. Furthermore, it was found that short circuits in combination with load coils could produce resonant circuit conditions such that the current in a particular load coil could be much greater than the line current supplied by the signal source. Additionally, load impedance at the desired test signal frequency is not always a monotonic function of line length even for modest distances. For example, tests using a 500 Hz test signal were conducted on lines composed of 15,000 feet of test trunk with loop lengths varying from 3,000 to 24,000 feet. These tests showed that for tip-to-ring shorts, the admittance magnitude as a function of loop length is concave in shape (i.e., not a single valued function). Thus, a third harmonic signal from a short could exceed that from a receiver-off-hook telephone.

SUMMARY OF THE INVENTION

An object of the present invention is to reduce the test signal amplitude in the aformentioned Hoppough apparatus. Another object of the invention is to control the amplitude of the test signal so that it is monotonically related to the length of the subscriber's lines.

These and other objects of the invention are achieved by applying a second alternating signal at a second frequency to the subscriber's lines and using the second signal current to control the amplitude of the test signal. Because amplitude control is derived from this second signal, the amplitude of the test signal can be minimized so that it is just sufficient for harmonics to be detected when a telephone is in a receiver-off-hook state. Furthermore, because harmonics of the second signal are not used for detecting a receiver-off-hook state, the frequency of the second signal may be selected so that monotonic control of the test signal amplitude is achieved.

DETAILED DESCRIPTION OF APPARATUS EMBODYING THE INVENTION

Figure 1:
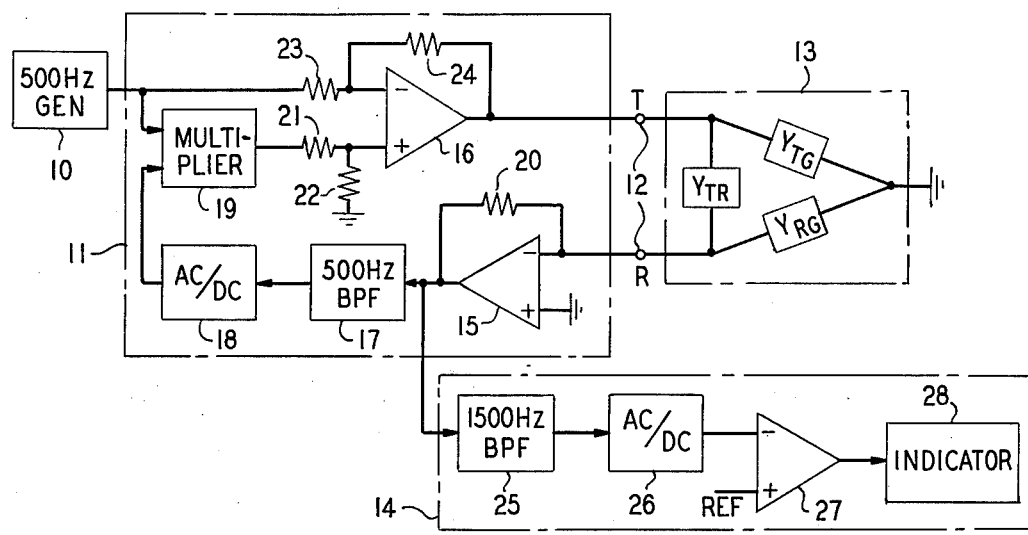
FIG. 1 shows a block diagram embodying the aforementioned Hoppough invention.

FIG. 1 shows an embodiment of the aforementioned Hoppough invention. In particular, a 500 Hz alternating signal from a source 10 is applied by a level controlling circuit 11 to a telephone subscriber's tip and ring terminals 12. The subscriber's line connected to tip and ring terminals 12 and the telephone connected to the other extremities of the line are represented by a block 13. (Block 13 contains a typical admittance representation of such structure.) Level controlling circuit 11 automatically sets the level of the alternating signals applied to the subscriber's line based upon the loading effect of block 13. Finally, a detector circuit 14 indicates when a 1500 Hz signal above a predetermined level is present on the subscriber's line. Such a harmonically related signal is produced when block 12 has a nonlinear impedance appearance as a result of a telephone in a receiver-off-hook condition.

Level controlling circuit 11 shown in FIG. 1 comprises two operational amplifiers 15 and 16, a 500 Hz bandpass filter 17, an ac-to-dc converter 18 and a multiplier 19. The inverting input terminal of amplitude 15 is connected to the ring terminal of tip and ring terminals 12 while the noninverting input of the amplifier is connected to ground. A feedback resistor 20 is connected between the inverting input and output terminal of amplifier 15. Amplifier 15 functions to cause the ring terminal to be at substantially ground potential while its output is a measure of the current flowing into and out of the ring terminal.

The 500 Hz component in the output of amplifier 15 is passed by filter 17 and converted to a dc potential by converter 18. This dc potential and the alternating signal of generator 10 are multiplied together in multiplier 19 and applied by way of a voltage divider, comprising resistors 21 and 22, to the noninverting input terminal of amplifier 16. The alternating signal from generator 10 is also applied through a resistor 23 to the inverting input terminal of amplifier 16. A feedback resistor 24 is connected between the output and inverting input terminals of amplifier 16. Resistors 21, 22, 23 and 24 are all substantially equal to one another. The difference output of amplifier 16 is applied to the tip terminal of tip and ring terminals 12.

In operation the 500 Hz signal present in the output of amplifier 15 is related to the loading effect of the structure represented by block 13. This controls the amplitude of the output of generator 10 applied to the noninverting terminal of amplifier 16 which, in turn, controls the amplitude of the 500 Hz signal between the tip terminal and ground. Amplifier 15, however, forces the ring terminal to be at substantially ground potential. As a consequence of these cooperative actions the application of the 500 Hz signal applied between tip and ring terminals 12 is controlled to a level related to the loading effect of block 13.

The output of amplifier 15 is also applied to detector circuit 14 which comprises a 1500 Hz bandpass filter 25, an ac-to-dc converter 26, a comparator 27 and an indicator 28. When a 1500 Hz component is present in the output of amplifier 15 it is passed by filter 25 and converted to a dc potential by converter 26. The level of this dc potential is compared to a reference potential by comparator 27. When the dc potential is greater than the reference potential, indicator 28 produces an output.

As mentioned earlier the above-described apparatus provides the desired results under most conditions. However, there are some conditions under which ambiguities may occur. In some cases it was found that load coils could still present nonlinear appearances. Furthermore, it was found that short circuits in combination with load coils could produce resonant circuit conditions such that the current in a particular load coil could be much greater than the line current supplied by the signal source. Additionally, load impedance at the desired test signal frequency is not always a monotonic function of line length even for modest distances. For example, tests using a 500 Hz test signal were conducted on lines composed of 15,000 feet of test trunk with loop lengths varying from 3,000 to 24,000 feet. These tests showed that for tip-to-ring shorts, the admittance magnitude as a function of loop length is concave in shape (i.e., not a single valued function). Thus, a third harmonic signal from a short could exceed that from a receiver-off-hook telephone.

Figure 2:
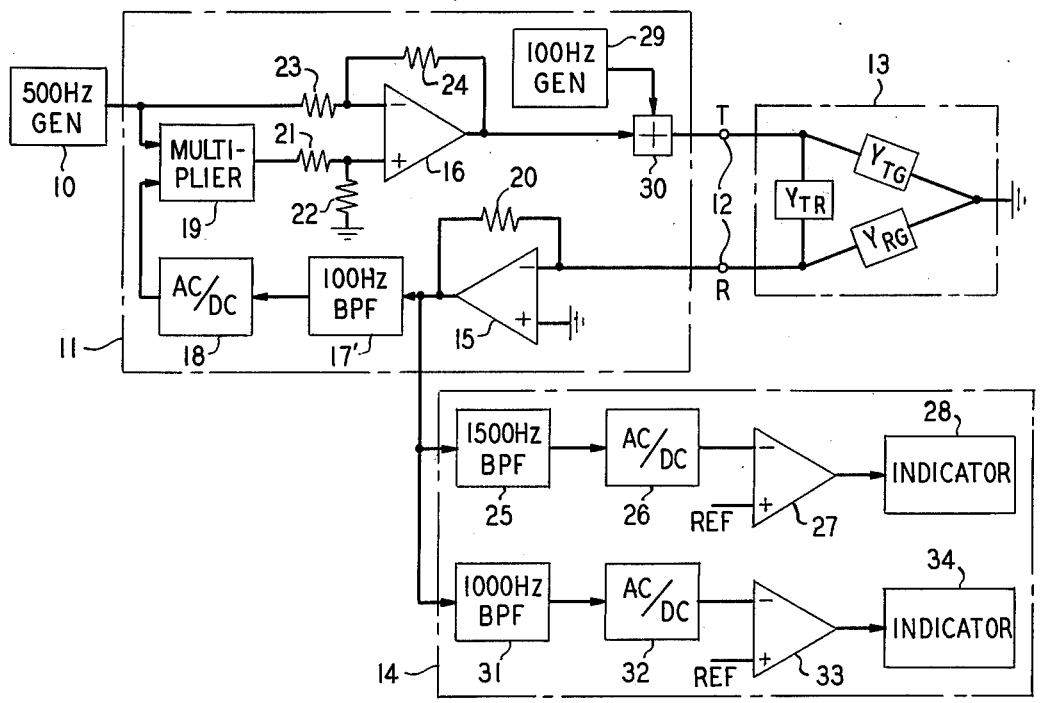
FIGS. 2 and 3 show block diagrams of two apparatus illustrating the present invention applied to the Hoppough invention.

In accordance with the present invention, these problems are overcome by using a second signal to, in effect, measure the loading of the telephone lines. This is illustrated by the apparatus of FIG. 2. This apparatus is similar to that of FIG. 1 and consequently identical elements thereof have been assigned the same symbols as used in FIG. 1. The apparatus of FIG. 2 differs from that of FIG. 1 in two respects. First, in accordance with the present invention a second signal at a frequency of 100 Hz is used for setting the first signal level. In particular, the output of a 100 Hz generator 29 is also applied to tip and ring terminals 12 by way of a summing circuit 30 and filter 17 of FIG. 1 has been replaced by 100 Hz bandpass filter 17'. The use of a second signal permits the level of the first signal to be more closely controlled so that substantially only the level necessary to detect an off-hook condition is applied to the tip and ring terminals.

The second difference in the apparatus of FIG. 2 is that detector circuit 14 has been expanded to also indicate the presence of a second harmonic signal in excess of a predetermined level. In particular, a 1000 Hz bandpass filter, an ac-to-dc converter 32, a comparator 33 and an indicator 34 have been added. Detection of the second harmonic is sometimes desirable when this harmonic is the predominant one in a receiver-off-hook condition.

Figure 3:
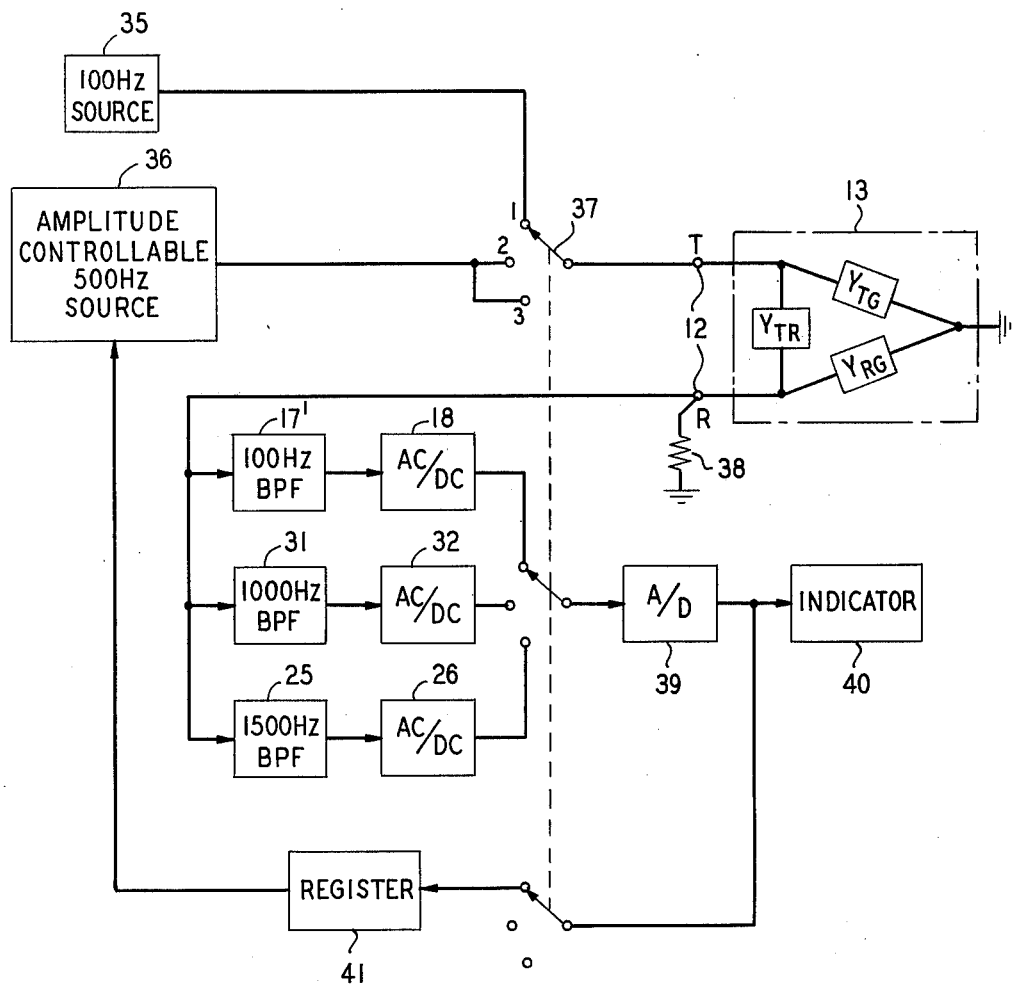

The present invention may be embodied in still other forms as demonstrated, for example, by the apparatus shown in FIG. 3. The apparatus of FIG. 3 includes a first source 35 for producing a substantially constant amplitude 100 Hz signal and a second source 36 for producing a 500 Hz signal at any one of a plurality of levels. Source 35 and 36 are connected to a 3-pole, 3-position switch 37 which in turn is connected to the tip terminal of terminals 12. When switch 37 is in its first position, source 35 is connected to the tip terminal; when the switch is in its second and third positions, source 36 is connected to the tip terminal. The ring terminal of terminals 12 is returned to ground by way of resistor 38. Whatever current flows through the lines also flows through resistor 38 and develops a signal which in turn is applied in parallel to bandpass filters 17', 31 and 25. The outputs of these filters are applied to ac-to-dc converters 18, 32 and 26, respectively. These filters and converters are the same as those used in the apparatus of FIG. 2 and consequently have been assigned the same symbols.

Converters 18, 32 and 26 are in turn connected to switch 37 which selects an output from one of the converters and applies it to an analog-to-digital converter 39. The output of converter 39 is applied to both an indicator 40 and the third pole of switch 37. In the first switch position, any 100 Hz signal developed across resistor 38 is passed through filter 17' converted to a digital form and applied to a register 41. In addition to storing the output of converter 39, register 41 applies a controlled input to source 36 to set the amplitude of the 500 Hz output from source 36.

In operation, switch 37 is first placed in its first position so that a 100 Hz signal is applied between the tip terminal and ground. The current path for this signal is through resistor 38 to ground. The signal developed across resistor 38 is passed by filter 17', converted to a dc signal by converter 18 and further converted into a digital signal by converter 39. This digital signal, which is an indication of the loading effect of the telephone line represented by block 13, is applied to and stored by register 41. The output of register 41 sets the output of source 36 to an amplitude level which is sufficient to test the telephone line but is not so great as to overdrive the line elements to produce undesired harmonics.

Switch 37 is next placed in position 2 or 3 depending on known characteristics of the line under test. In either of these positions the 500 Hz signal from source 36 is applied between the tip terminal and ground. In position 2 any second harmonic signal developed across resistor 38 results in an indication by indicator 40, while in position 3 any third harmonic signal developed across resistor 38 results in an indication by indicator 40. Such indications are indicative of receiver-off-hook telephones while the absence of any indications is indicative of the absence of a receiver-off-hook telephone.

What is claimed is:

1. In apparatus for detecting a telephone receiver-off-hook condition from a location remote from the telephone but interconnected therewith by a transmission line where said apparatus comprises first means for use at said location for applying to said transmission line an amplitude-controlled test signal where the amplitude is related to the loading effect of said transmission line, and second means for use at said location for producing an output when a signal having a frequency harmonically related to the frequency of said test signal and exceeding a predetermined amplitude is present on said line, an improvement characterized in that:

said first means produces, for application to said transmission line, a second alternating signal having a frequency different from said test signal, and said first means is responsive to current produced by said second signal to control the amplitude of said test signal.

2. Apparatus for connection to one extremity of a transmission line to detect a receiver-off-hook telephone at the other extremity of said line, said apparatus comprising first means for applying a first signal at a first frequency to said line, second means for applying a second signal at a second frequency to said line, third means responsive to current produced in said line by said second signal to control the amplitude of said first signal, and fourth means for indicating the presence on said line of a signal harmonically related to said first signal.

3. Apparatus in accordance with claim 2 wherein said first and second signals are simultaneously applied to said line.

4. Apparatus in accordance with claim 2 wherein said second signal and said first signal are applied in sequence in that order to said line, and said third means is responsive to said second signal current while said second signal is applied to said line and controls said first signal amplitude while said first signal is applied to said line.

5. Apparatus for connection to one extremity of a transmission line to detect a receiver-off-hook telephone at the other extremity of said line, said apparatus comprising first means for producing a first signal at a first frequency, second means for producing a second signal at a second frequency, third means for sequentially applying said second signal and said first signal in that order to said line, fourth means responsive to line current produced by said second signal to control the amplitude of said first signal while applied to said line, and fifth means for indicating the presence on said line of a signal harmonically related to said first signal.

* * * * *